United States Patent
Jang

(10) Patent No.: US 8,873,071 B2
(45) Date of Patent: Oct. 28, 2014

(54) IMAGE FORMING METHOD USING UNIVERSAL PRINTER DRIVER AND DEVICE FOR PERFORMING THE IMAGE FORMING METHOD

(75) Inventor: Myung-yul Jang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 939 days.

(21) Appl. No.: 12/369,090

(22) Filed: Feb. 11, 2009

(65) Prior Publication Data

US 2009/0296126 A1 Dec. 3, 2009

(30) Foreign Application Priority Data

May 30, 2008 (KR) .................................. 2008-51083

(51) Int. Cl.
*G06F 3/12* (2006.01)
*G06K 15/00* (2006.01)

(52) U.S. Cl.
CPC ............ *G06F 3/1228* (2013.01); *G06F 3/1254* (2013.01); *G06F 3/1253* (2013.01); *G06F 3/1255* (2013.01); *G06F 3/1204* (2013.01); *G06F 3/1205* (2013.01); *G06F 3/1285* (2013.01)
USPC .......................... 358/1.13; 358/1.15; 358/1.14

(58) Field of Classification Search
CPC ... G06F 3/1228; G06F 3/1253; G06F 3/1254; G06F 3/1255; G06F 3/1204; G06F 3/1205; G06F 3/1285
USPC ...................................... 358/1.15, 1.13, 1.14
See application file for complete search history.

(56) References Cited

U.S. PATENT DOCUMENTS

| | | | | |
|---|---|---|---|---|
| 6,335,795 B1 * | 1/2002 | Neuhard et al. | ............. | 358/1.15 |
| 7,283,258 B1 * | 10/2007 | Kuno et al. | ................... | 358/1.13 |
| 2002/0097432 A1 * | 7/2002 | Kumashio | ..................... | 358/1.15 |
| 2003/0011805 A1 * | 1/2003 | Yacoub | ........................ | 358/1.15 |
| 2006/0224780 A1 | 10/2006 | Saito | | |
| 2007/0103719 A1 | 5/2007 | Azuchi | | |

(Continued)

FOREIGN PATENT DOCUMENTS

| CH | 1991603 | 7/2007 |
|---|---|---|
| CH | 1996230 | 7/2007 |

(Continued)

OTHER PUBLICATIONS

Chinese Office Action issued Jan. 11, 2013 in corresponding Chinese Patent Application No. 200910134519.8.

(Continued)

*Primary Examiner* — Fred Guillermety
(74) *Attorney, Agent, or Firm* — Staas & Halsey LLP

(57) ABSTRACT

Provided are an image forming method using a universal printer driver and a device for performing the image forming method. According to the method, printing data may be output through an image forming device supporting a desired printing option, without checking printing options of image forming devices whenever the printing data is to be output, by providing a user interface displaying printing options supported by image forming devices connected to a host device in which a universal printer driver is installed; selecting at least one printing option from the provided user interface; and selecting on of the image forming devices determined to support the selected printing option and outputting printing data through the selected image forming device supporting the selected printing option.

21 Claims, 9 Drawing Sheets

(56) References Cited

U.S. PATENT DOCUMENTS

2007/0147928 A1 6/2007 Oyumi et al.
2007/0153003 A1 7/2007 Jang
2008/0259390 A1* 10/2008 Murase .................. 358/1.15

FOREIGN PATENT DOCUMENTS

| JP | 2002-215353 | 8/2002 |
|----|-------------|--------|
| JP | 2007-133611 | 5/2007 |
| JP | 2007-200304 | 8/2007 |
| JP | 2008-3784 | 1/2008 |
| KR | 2006-105501 | 10/2006 |

OTHER PUBLICATIONS

Chinese Office Action dated Aug. 27, 2013 in Chinese Patent Application No. 200910134519.8.
Chinese Office Action mailed Mar. 7, 2014 in related Chinese Application No. 200910134519.8.
Korean Office Action mailed Feb. 4, 2014 in related Korean Application No. 10-2008-0051083.
Korean Notice of Final Rejection mailed Jul. 28, 2014 in related Korean Application No. 10-2008-0051083.

* cited by examiner

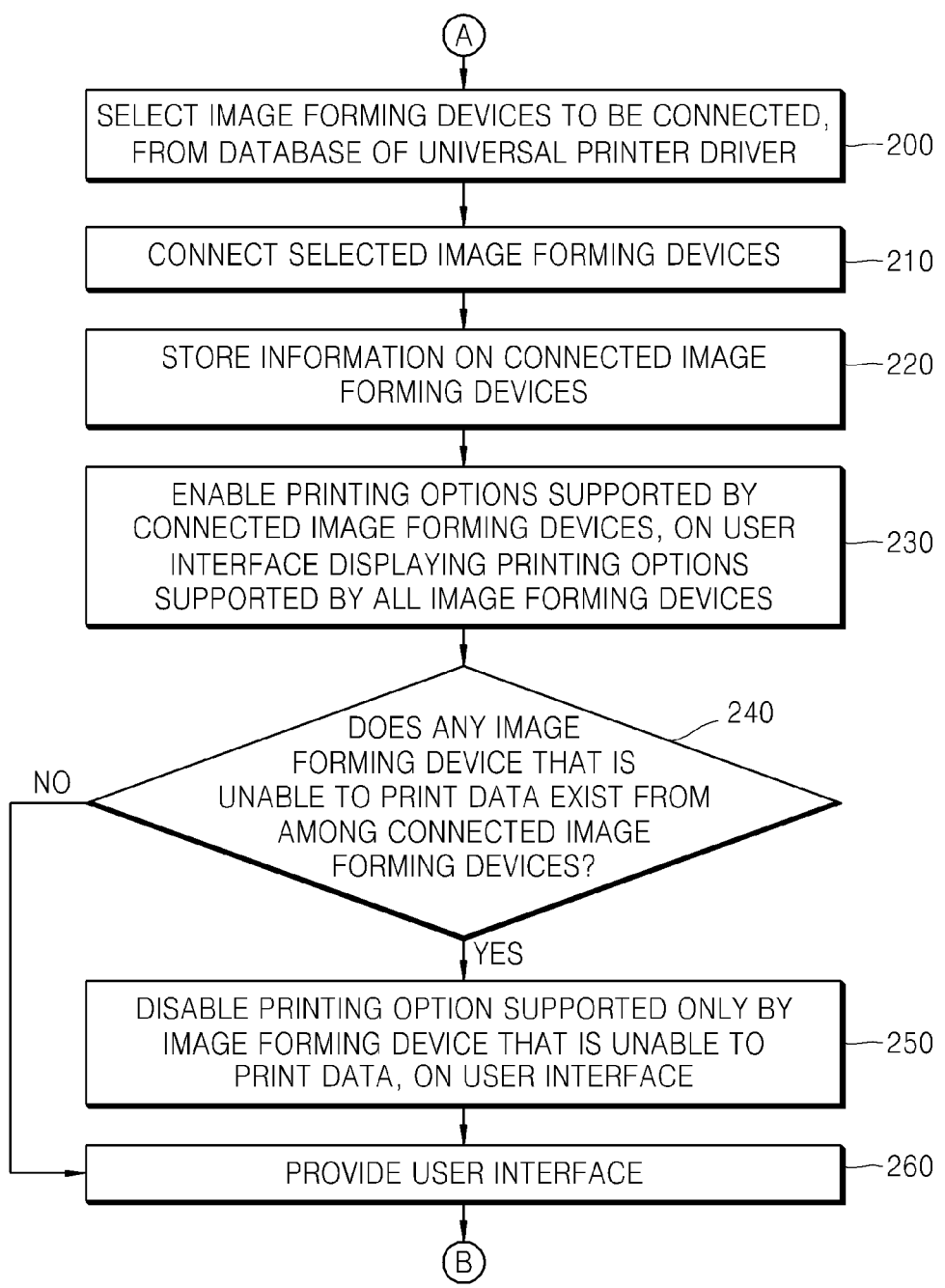

IMAGE FORMING METHOD USING UNIVERSAL PRINTER DRIVER AND DEVICE FOR PERFORMING THE IMAGE FORMING METHOD

CROSS-REFERENCE TO RELATED APPLICATION

This application claims the benefit of Korean Patent Application No. 2008-51083, filed on May 30, 2008 in the Korean Intellectual Property Office, the disclosure of which is incorporated herein in its entirety by reference.

BACKGROUND OF THE INVENTION

1. Field of the Invention

Aspects of the present general inventive concept relate to an image forming method using a universal printer driver and a device for performing the image forming method, and more particularly, to a method of outputting printing data through an image forming device performing a user-desired printing option, and a device for performing the method.

2. Description of the Related Art

In general, when an image forming device such as a printer forms an image corresponding to document created by a host device such as a personal computer (PC), the host device requires a printer driver for driving the image forming device. That is, a printer driver corresponding to the image forming device has to be installed in order to form an image in the image forming device. Also, a certain image forming device has to be selected in order to use the image forming device. When an image is formed by using a user-desired printing option, a certain image forming device also has to be selected in advance. In this case, a printing option supported by the selected image forming device may become known only by checking default settings or properties of the selected image forming device. Thus, if the selected image forming device does not have the user-desired printing option, another image forming device has to be selected and printing options supported by the re-selected image forming device have to be verified by checking the default settings or the properties of the re-selected image forming device. Accordingly, a method of outputting printing data through an image forming device supporting a desired printing option, without checking printing options of image forming devices whenever the printing data is to be output, is demanded.

SUMMARY OF THE INVENTION

Aspects of the present general inventive concept provide a method of outputting printing data through an image forming device supporting a desired printing option, without checking printing options of image forming devices whenever the printing data is to be output.

Aspects of the present general inventive concept also provide a computer readable recording medium having recorded thereon a computer program for executing the method.

According to aspects of the present general inventive concept, there are provided an image forming method using a universal printer driver, including providing a user interface displaying printing options supported by image forming devices connected to a host device in which the universal printer driver is installed; selecting at least one printing option from the user interface; and outputting printing data through an image forming device supporting the selected printing option.

According to other aspects of the present general inventive concept, there is provided a computer readable recording medium having recorded thereon a computer program for executing the image forming method.

According to other aspects of the present general inventive concept, there are provided a device using a universal printer driver, including a display unit providing a user interface displaying printing options supported by image forming devices connected to a host device in which the universal printer driver is installed; a selection unit selecting at least one printing option from the user interface; and a transmission unit outputting printing data through an image forming device supporting the selected printing option.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a detailed flowchart of a method of providing a user interface displaying printing options supported by image forming devices connected to a host device in which a universal printer driver is installed, according to an embodiment of the present invention;

DETAILED DESCRIPTION OF THE EMBODIMENTS

Figure 1A:
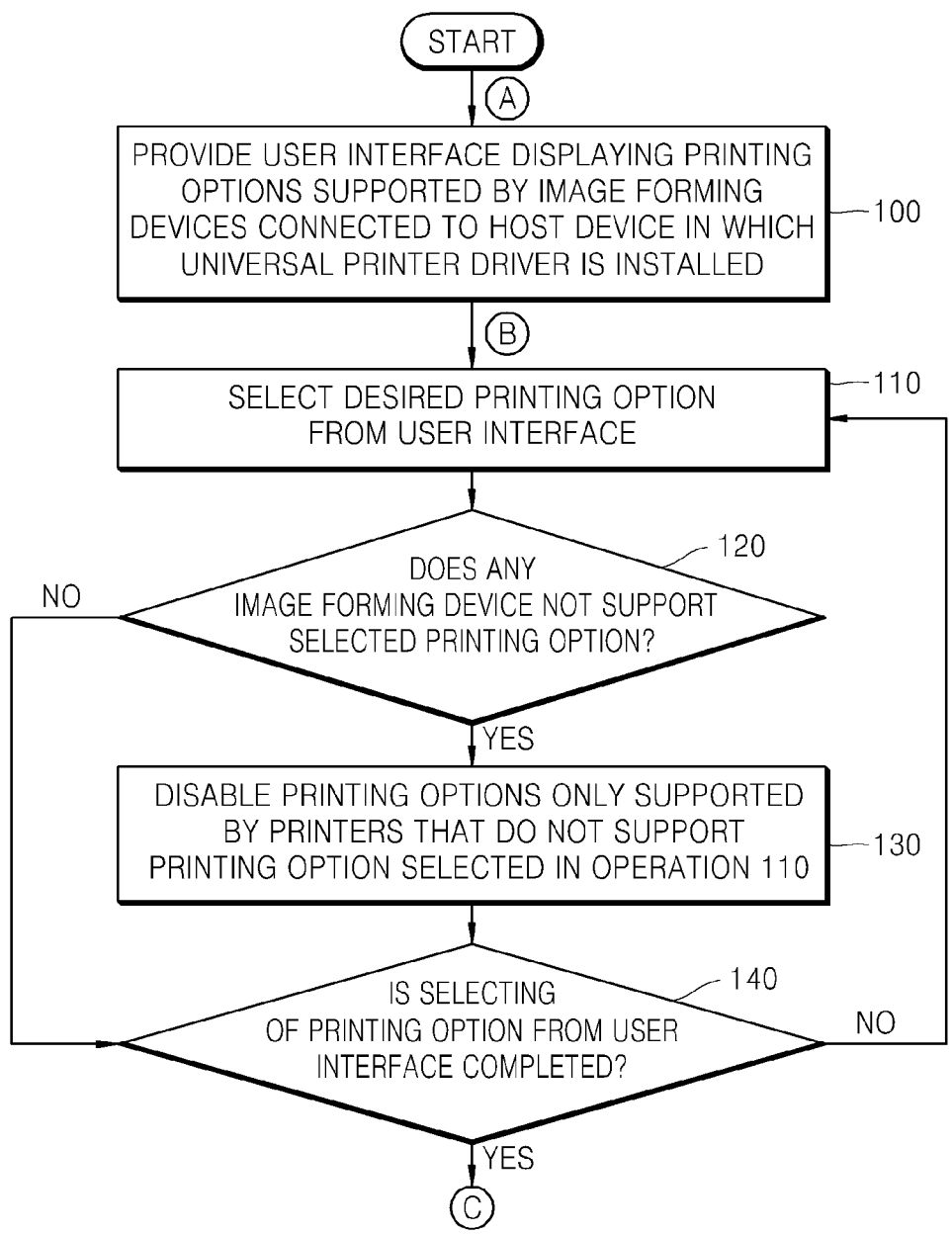
FIG. 1A and FIG. 1B illustrate a flowchart of an image forming method using a universal printer driver, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
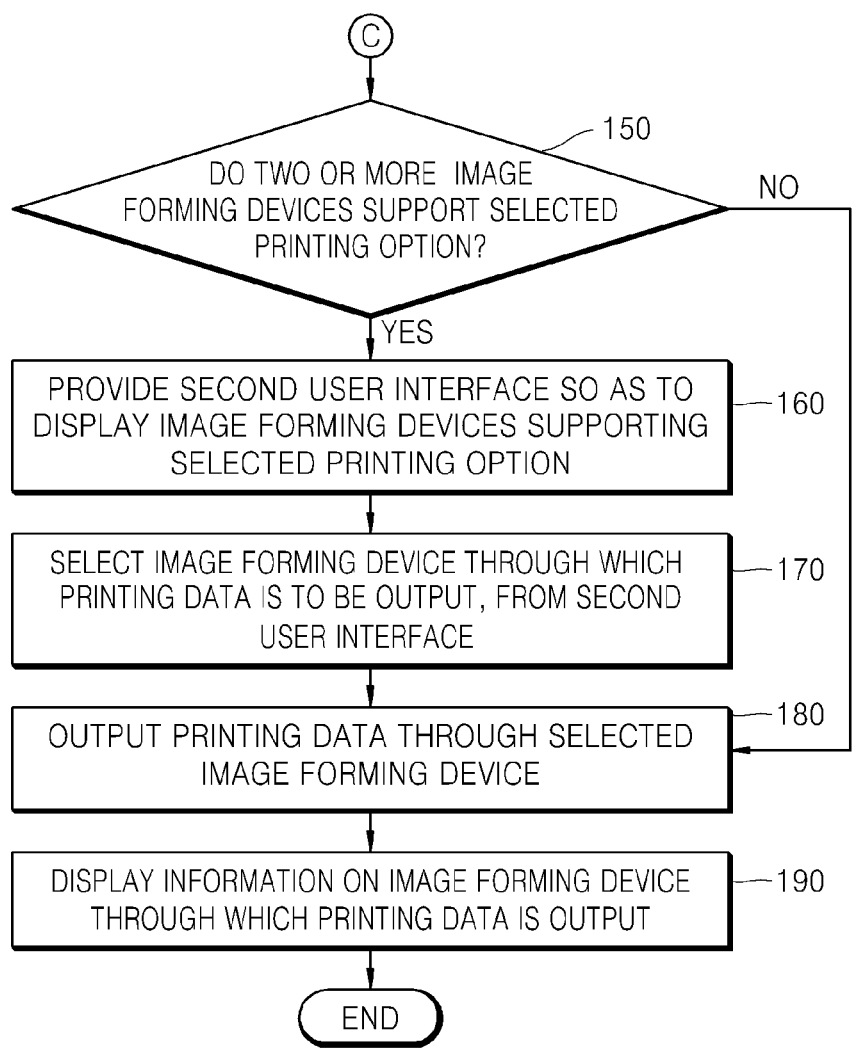

FIGS. 1A and 1B are a flowchart of an image forming method using a universal printer driver, according to an embodiment of the present invention. Referring to FIG. 1A, in operation 100, a user interface displaying printing options supported by image forming devices connected to a host device in which a universal printer driver is installed, is provided.

FIG. 2 is a detailed flowchart of a method of performing operation 100 illustrated in FIG. 1A, according to an embodiment of the present invention. Referring to FIG. 2, operation 100 illustrated in FIG. 1A will be described in detail.

In operation 200, image forming devices to be connected are selected from a database of a universal printer driver. In this case, the database of the universal printer driver may include information on model names and printing options of connectable image forming devices.

Figure 3:
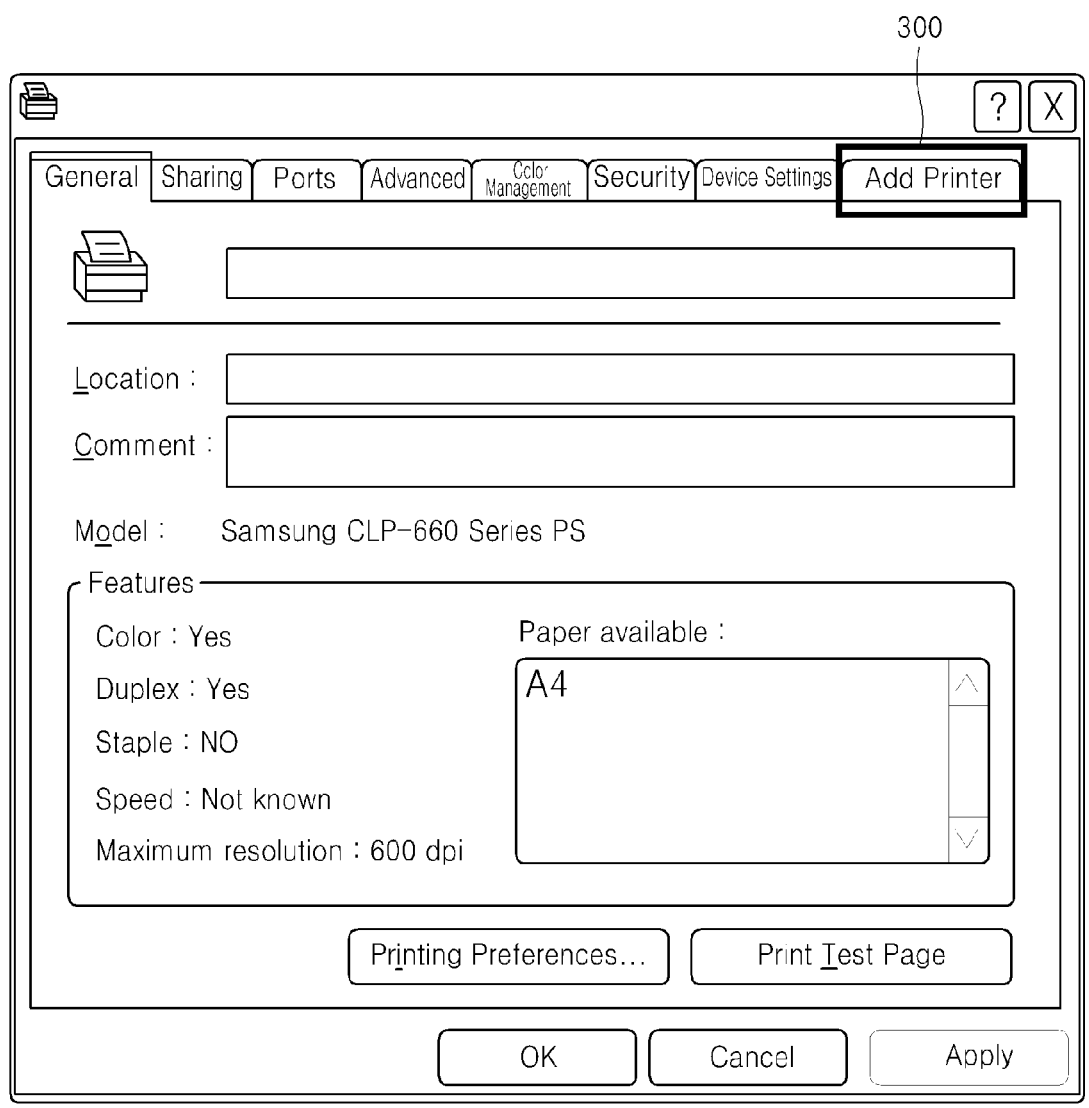
FIGS. 3 and 4 illustrate user interfaces for connecting an image forming device, according to an embodiment of the present invention.
Figure 4:
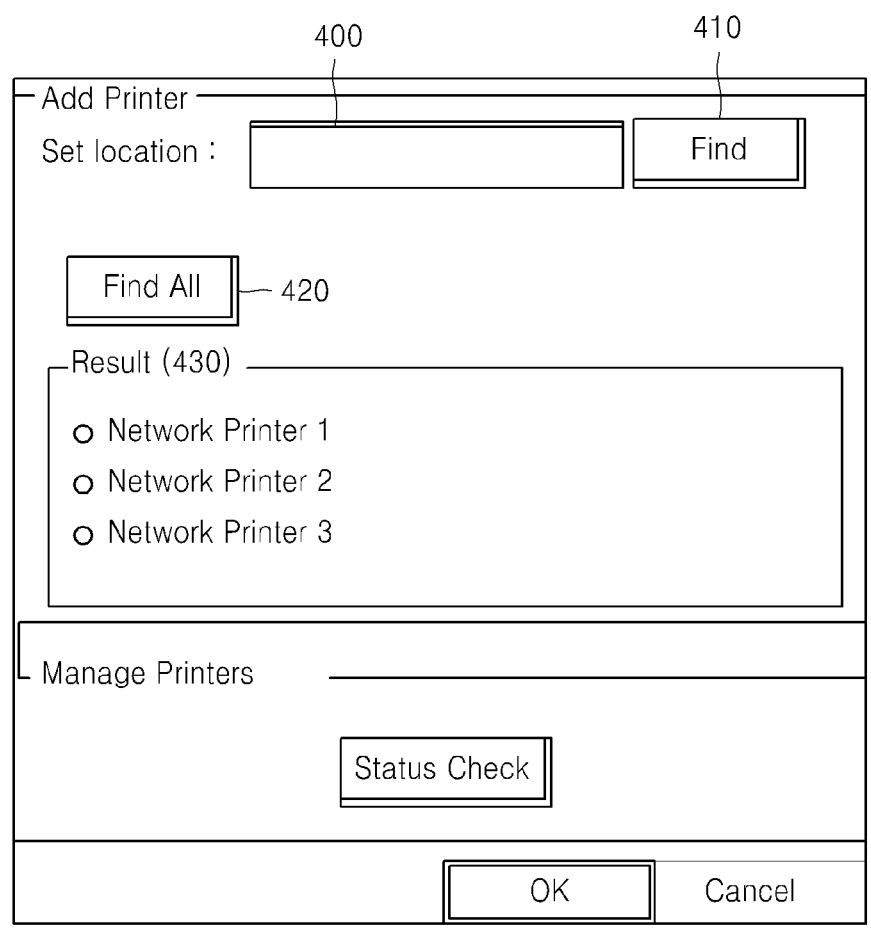

FIGS. 3 and 4 illustrate user interfaces for connecting an image forming device, according to an embodiment of the present invention. Referring to FIGS. 3 and 4, operation 200 illustrated in FIG. 2 will be described in detail.

If an "Add Printer" tab 300 is clicked on the user interface illustrated in FIG. 3, the user interface illustrated in FIG. 4 is provided. If a "Find" button 410 is clicked after a location, to which the image forming devices are connected, is designated in a "Set location" box 400 on the user interface illustrated in FIG. 4, a database of a universal printer driver, which includes model names and printing option information of connectable image forming devices, is provided. The image forming devices to be connected are selected form the database of the universal printer driver.

Also, if a "Find All" button 420 is clicked on the user interface illustrated in FIG. 4, available image forming devices are displayed in a "Result" box 430. Thus, the image forming devices to be connected may be selected from the available image forming devices which are displayed in the "Result" box 430.

Referring back to FIG. 2, in operation 210, the image forming devices selected in operation 200 are connected. In operation 220, information on the connected image forming devices is stored. Each of the selected image forming devices may be connected using a plug and play (PnP) interface or a wired and/or wireless network, by way of example. Thus, operation 220, involves storing information on connection ports of the connected image forming devices.

Figure 5:
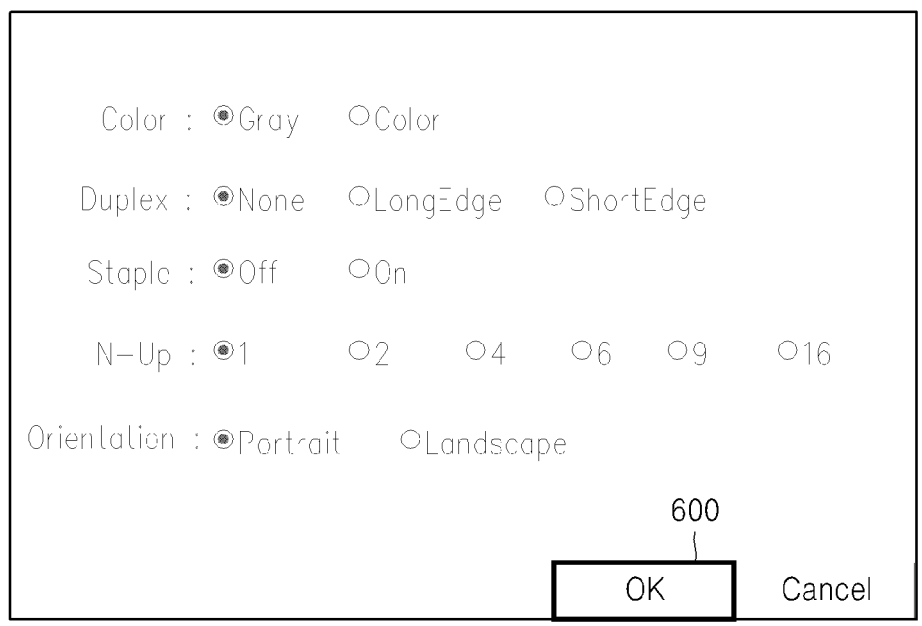
FIG. 5 illustrates a user interface displaying printing options supported by all image forming devices, according to an embodiment of the present invention.
Figure 6:
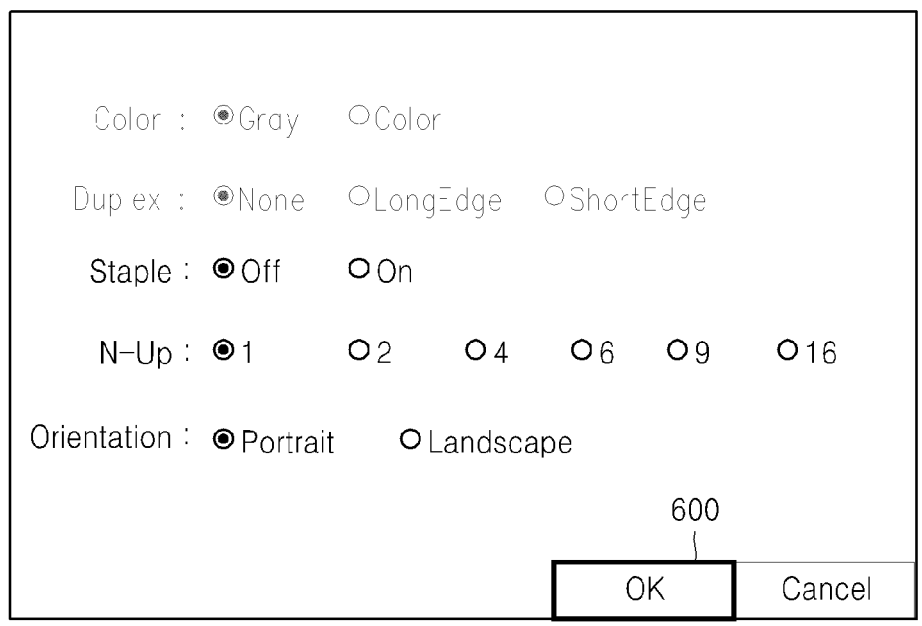
FIGS. 6 through 8 illustrate user interfaces which are changed from the user interface illustrated in FIG. 5, based on connected image forming devices, according to embodiments of the present invention.
Figure 7:
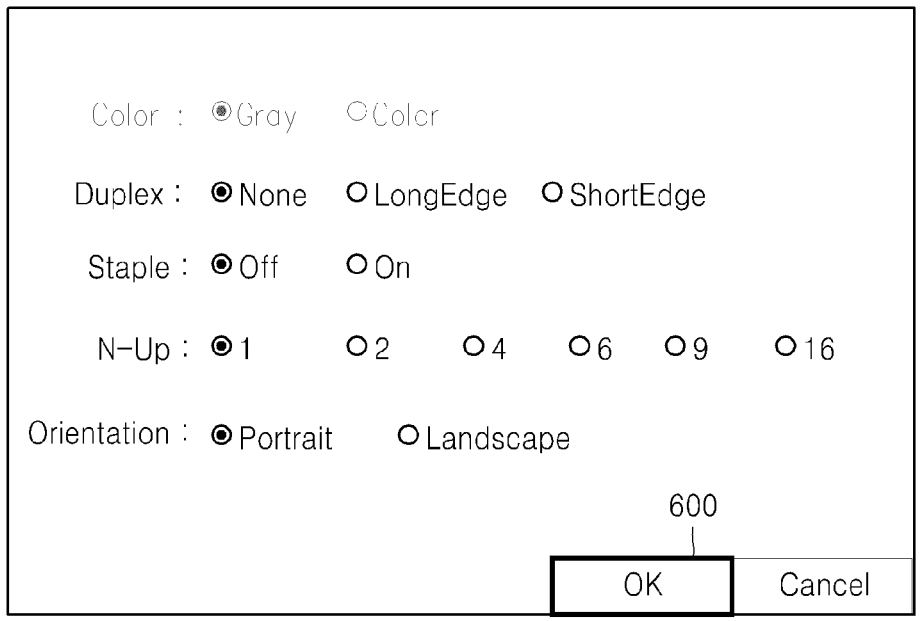
Figure 8:
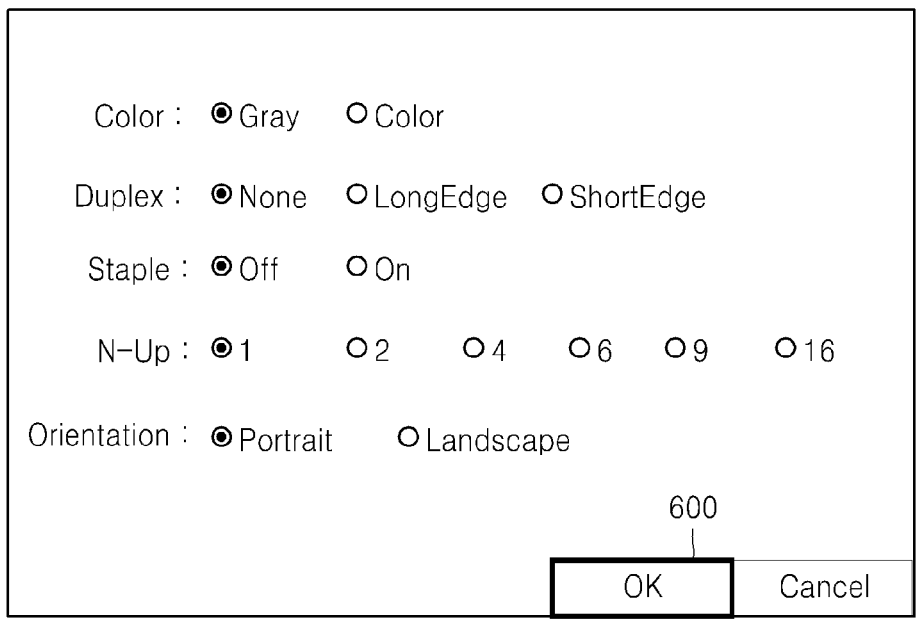

Operation 230 enables printing options supported by the connected image forming devices on a user interface displaying printing options supported by all image forming devices. FIG. 5 illustrates a user interface displaying printing options supported by all image forming devices and used in operation 230, according to an embodiment of aspects of the present invention. FIGS. 6 through 8 illustrate user interfaces which are modified as per the user interface illustrated in FIG. 5, based on connected image forming devices, according to embodiments of aspects of the present invention. Such interfaces can be accessed by clicking on the printing preferences button shown in FIG. 3, and/or through tabs of the shown user interface in FIG. 2.

Referring to FIGS. 5 and 8 and Table 1, operation 230 illustrated in FIG. 2 will be described in detail. Table 1 shows printing options supported by connected image forming devices, according to an embodiment of aspects of the present invention.

TABLE 1

| Features | Models | | |
| --- | --- | --- | --- |
| | A | B | C |
| Color | ✓ | | |
| Duplex | ✓ | ✓ | |
| Staple | | | ✓ |
| N-Up | ✓ | ✓ | ✓ |
| Orientation | ✓ | ✓ | ✓ |
| Port | USB | Network Printer 1 | Network Printer 2 |

As shown in Table 1, an image forming device A supports printing options such as a color option, a duplex option, an N-up option, and an orientation option; an image forming device B supports printing options such as the duplex option, the N-up option, and the orientation option; and an image forming device C supports printing options such as a staple option, the N-up option, and the orientation option. However, the image forming device A does not support a staple option; the image forming device B does not support color and staple options; and the image forming device C does not support color and duplex options.

According to an embodiment of the present invention, a process performed when the image forming devices C, B, and A of Table 1 are connected in this order, will now be described. When the image forming device C is connected, the staple option, the N-up option, and the orientation option, which are supported by the image forming device C are enabled, and thus the user interface illustrated in FIG. 5 is changed into the user interface illustrated in FIG. 6. If a printing option is enabled on a user interface, the enabled printing option may be selected. As shown, the selected options are highlighted in a bold, and the non-enabled options are in lighter gray. However, the enabled and not enabled functions can otherwise be distinguished, such as using different colors, patterns, fonts, sizes, etc.

Then, when the image forming device B further supporting the duplex option in addition to the printing options supported by the image forming device C, is connected, the duplex option is further enabled, and thus the user interface illustrated in FIG. 6 is changed into the user interface illustrated in FIG. 7.

Then, when the image forming device A, further supporting the color option in addition to the printing options supported by the image forming devices B and C, is connected, the color option is further enabled, and thus the user interface illustrated in FIG. 7 is changed into the user interface illustrated in FIG. 8. As shown, since all options are supported collectively by image forming devices A, B, and C, all options are highlighted.

Referring back to FIG. 2, in operation 240, it is checked whether any image forming device from among the connected image forming devices is unable to print data. Even a connected image forming device may be unable to print data, based on a connection state. Thus, it is checked whether the connected image forming devices are currently connected, by performing data communication with the connected image forming devices. An image forming device that is not substantially connected is determined to be an image forming device that is unable to print data.

In operation 250, a printing option supported only by the image forming device that is unable to print data, is disabled on the user interface. Alternatively, the printing option supported only by the image forming device that is unable to print data, may not be displayed on the user interface. By way of example, if the image forming device A is determined as the image forming device that is unable to print data from among the image forming devices A, B, and C, in operation 240, the color option supported only by the image forming device A is disabled on the user interface, as illustrated in FIG. 7. Thus, as shown in FIG. 7, the color option is no longer highlighted, but the remaining options are highlighted.

In operation 260, the user interface is provided. In more detail, the user interface in which states of the printing options are completely changed, is provided. Referring back to FIG. 1, in operation 110, a desired printing option is selected from among the printing options on the user interface. If the user interface illustrated in FIG. 8 is provided in operation 260 of FIG. 2, then in operation 110, the desired printing option is selected from among the printing options on the user interface illustrated in FIG. 8. According to an embodiment of the present invention, an N-up option is selected from the user interface illustrated in FIG. 8.

In operation 120, it is checked whether any image forming device does not support the selected printing option. If an image forming device does not support the selected printing option, the image forming method proceeds to operation 130. If not, the image forming method proceeds to operation 140. By way of example, as shown in Table 1, the N-up option is supported by all of the connected image forming devices, that is, image forming devices A, B, and C. Thus, if the option is selected to be the N-up option, there are no image forming devices that do not support the selected printing option and the image forming method proceeds to operation 140.

Figure 9:
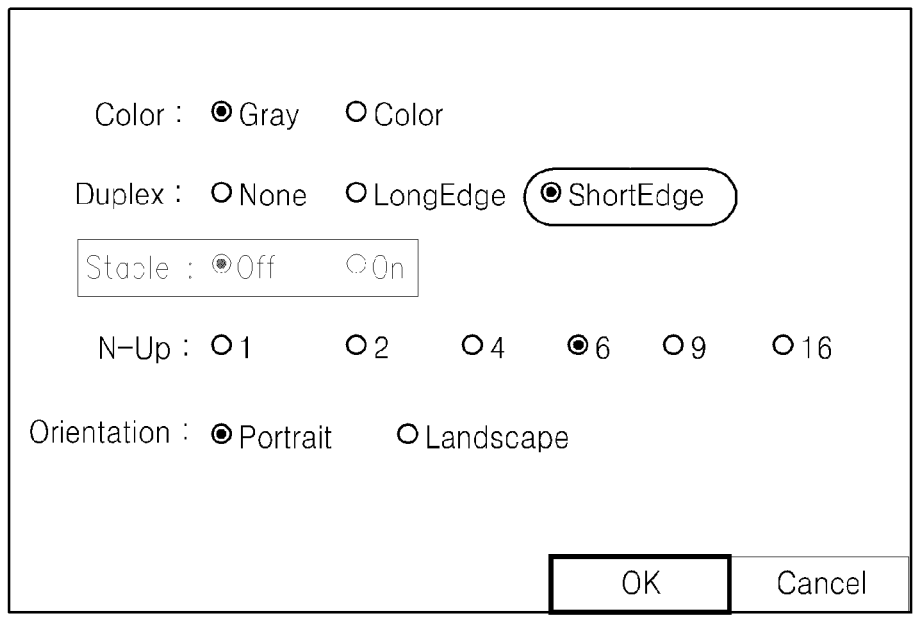
FIG. 9 illustrates a user interface that is changed from the user interface illustrated in FIG. 5, based on whether an image forming device is able to print data, according to an embodiment of the present invention.

In operation 130, a printing option supported only by the image forming device that does not support the selected printing option, is disabled on the user interface. In other words, after selecting a first selected printing option, remaining printing options that are not supported by the image forming device supporting the first selected printing option are disabled on the user interface. By way of example, if a duplex option is selected from the user interface illustrated in FIG. 8, as shown in Table 1, the duplex option is only supported by the image forming devices A and B and is not supported by the image forming device C. Thus, as illustrated in FIG. 9, a staple option supported only by the image forming device C is disabled on the user interface. If a printing option is disabled on a user interface, the disabled printing option may not be selected any more. FIG. 9 illustrates a user interface that is changed from the user interface illustrated in FIG. 8, based on whether an image forming device is able to print data, according to an embodiment of aspects of the present invention. Accordingly, the user interface illustrated in FIG. 8 is changed into the user interface illustrated in FIG. 9, on which the staple option is disabled.

In operation 140, it is checked whether selecting of the printing option from the user interface is completed. If the selecting of the printing option is completed, the image forming method proceeds to operation 150. If not, the image forming method returns to operation 110. If an "OK" button 600 illustrated in FIGS. 6 through 8 is clicked, it is determined that the selecting of the printing option is completed. Accordingly, it may be checked whether the selecting of the printing option is completed, based on whether the "OK" button 600 is clicked.

In operation 150, it is checked whether two or more image forming devices support the selected printing option. If two or more image forming devices support the selected printing option, the image forming method proceeds to operation 160. If not, the image forming method proceeds to operation 180. According to an embodiment of the present invention, if the N-up option and the duplex option are selected, the image forming devices A and B support the selected N-up option and the duplex option, but the image forming device C does not. In other words, two or more image forming devices support the selected printing option and thus the image forming method proceeds to operation 160. On the other hand, according to an embodiment of the present invention, if only the color option is selected, only the image forming device A supports the selected color option and thus the image forming method proceeds to operation 180.

Figure 10:
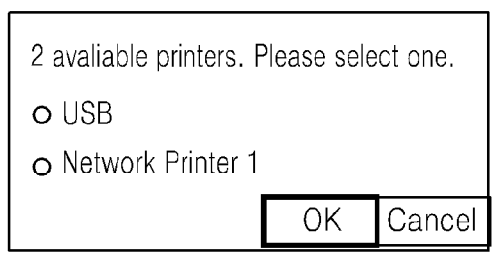
FIG. 10 illustrates a user interface when two or more image forming devices support a selected printing option, according to an embodiment of the present invention.

In operation 160, a second user interface is provided so as to display the image forming devices supporting the selected printing option. According to an embodiment of aspects of the present invention, if the N-up option and the duplex option are selected, the image forming devices A and B support the selected N-up option and the duplex option, and thus the second user interface is provided so as to display both of the image forming devices A and B. FIG. 10 illustrates a second user interface when two or more image forming devices support a selected printing option, according to an embodiment of the present invention. Accordingly, the second user interface is provided as illustrated in FIG. 10.

In operation 170, an image forming device through which printing data is to be output, is selected from the second user interface. If the second user interface illustrated in FIG. 10 is provided, the image forming device through which the printing data is to be output is selected from among the image forming devices on the second user interface, as illustrated in FIG. 10, which are a "universal serial bus (USB) printer" and a "network printer 1".

In operation 180, the printing data is output through the selected image forming device. If the "network printer 1" is selected from the second user interface illustrated in FIG. 10, the printing data is transmitted to and is output through the "network printer 1".

Figure 11:
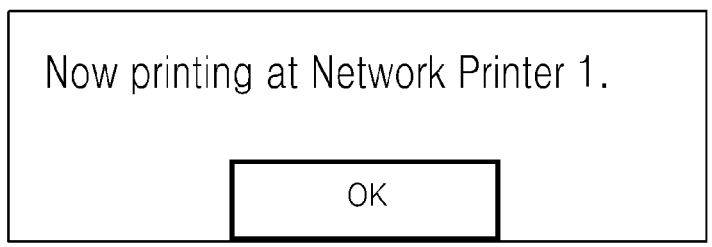
FIG. 11 illustrates a user interface displaying information on an image forming device after printing data is output, according to an embodiment of the present invention.

In operation 190, information on the image forming device through which the printing data is output, is displayed. FIG. 11 illustrates a user interface displaying information on an image forming device after printing data is output, according to an embodiment of aspects of the present invention. If the "network printer 1" is selected and the printing data is output through the "network printer 1", the information on the image forming device through which the printing data is output, may be displayed as in the user interface illustrated in FIG. 11. In this case, information on a model name or a connection means of the image forming device may be displayed.

In the above description, if two or more image forming devices on the user interface illustrated in FIG. 8 support the selected printing option, the second user interface is provided so as to display all of the image forming devices supporting the selected printing option, and the printing data is output through the image forming device selected from the provided second user interface. However, the present invention is not limited thereto. The printing data may be output through an image forming device having a higher priority based on a preset priority order. In more detail, when the preset priority order indicates an order of A, B, and C, if the image forming devices A and B on the user interface illustrated in FIG. 8 support the selected printing option, the printing data may be output through the image forming device A having the highest priority. Such priority can be based upon printing speed, user defined selection, location, remaining printer toner and/or paper, etc. Also, if an image forming device set as default, the printing data may be output through the image forming device set as default, with priority.

Figure 12:
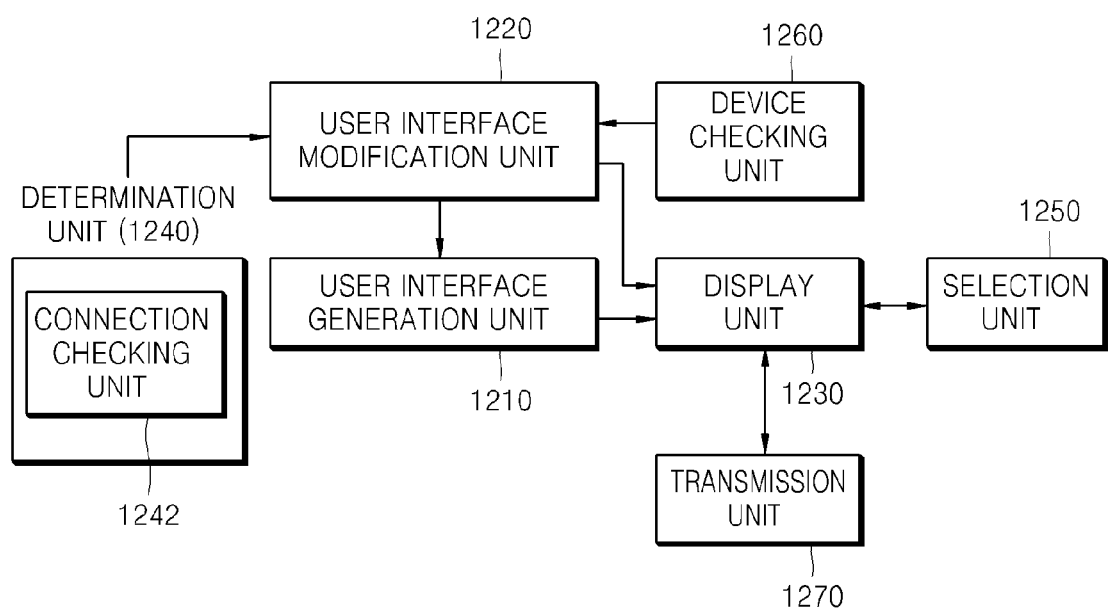
FIG. 12 is a block diagram of a device for performing an image forming method using a universal printer driver, according to an embodiment of the present invention.

FIG. 12 is a block diagram of a device 1200 for performing an image forming method using a universal printer driver, according to an embodiment of aspects of the present invention. Referring to FIG. 12, according to an embodiment of aspects of the present invention, the device 1200 includes a user interface generation unit 1210, a user interface modification unit 1220, a display unit 1230, a determination unit 1240, a selection unit 1250, a device checking unit 1260, and a transmission unit 1270. While not required, in all aspects, the device 1200 can be implemented using a computer, a portable device, etc.

The user interface generation unit 1210 generates a user interface displaying printing options supported by all image forming devices. In this case, the generated user interface is as illustrated in FIG. 5.

If image forming devices are connected through the universal printer driver, the user interface modification unit 1220 enables printing options on the user interface corresponding to the connected image forming devices as generated by the user interface generation unit 1210. In more detail, using the example shown in Table 1, if an image forming device C is connected through the universal printer driver, the image forming device C supports printing options such as a staple option, an N-up option, and an orientation option and thus the user interface modification unit 1220 enables the staple option, the N-up option, and the orientation option supported by the image forming device C, on the user interface illustrated in FIG. 5. Accordingly, the user interface illustrated in FIG. 5 is changed into the user interface illustrated in FIG. 6. If a printing option is enabled on a user interface, the enabled printing option may be selected.

Then, when an image forming device B is connected, the image forming device B further supports a duplex option in addition to the printing options supported by the image forming device C and thus the user interface modification unit 1220 enables the duplex option on the user interface illustrated in FIG. 6. Accordingly, the user interface illustrated in FIG. 6 is changed into the user interface illustrated in FIG. 7.

Then, when an image forming device A is connected, the image forming device A further supports a color option in addition to the printing options supported by the image forming devices B and C and thus the user interface modification unit 1220 enables the color option on the user interface illustrated in FIG. 7. Accordingly, the user interface illustrated in FIG. 7 is changed into the user interface illustrated in FIG. 8.

The display unit 1230 provides the user interface displaying the printing options supported by the image forming devices which are connected through the universal printer driver. Also, if a state of the user interface is changed by the user interface modification unit 1220, the display unit 1230 displays the changed user interface. The display unit 1230 provides the user interface and a second user interface. The user interface and the second user interface are provided by using the same window or different windows.

The determination unit 1240 checks whether the connected image forming devices are able to print data. Any image forming device from among the connected image forming devices may not be able to print data. Thus, the determination unit 1240 checks whether the connected image forming devices are currently connected so as to transmit/receive printing data, by performing data communication with the connected image forming devices, and determines an image forming device that is not connected to the device 1200, as an image forming device that is unable to print data.

If any image forming device is determined to be the image forming device that is unable to print data, the determination unit 1240 notifies the user interface modification unit 1220 about such determination.

The user interface modification unit 1220 disables a printing option supported only by the image forming device that is unable to print data on the user interface. If the determination unit 1240 determines that, from among the connected image forming devices A, B, and C, the image forming device A is the image forming device unable to print data, the user interface modification unit 1220 disables the color option supported only by the image forming device A, on the user interface illustrated in FIG. 8. Accordingly, the user interface illustrated in FIG. 8 is changed into the user interface illustrated in FIG. 7. Alternatively, the user interface modification unit 1220 may not display the printing option supported only by the image forming device that is unable to print data, on the user interface.

The selection unit 1250 selects at least one printing option from the user interface provided by the display unit 1230. Whenever the selection unit 1250 selects a printing option, the device checking unit 1260 checks whether any image forming device does not support the selected print option. If an image forming device does not support the selected print option, the device checking unit 1260 notifies the user interface modification unit 1220 about such determination.

The user interface modification unit 1220 disables remaining printing options that are not supported by the image forming device that supports the selected print option that was first selected on the user interface.

If selecting of the printing option from the user interface is completed, the transmission unit 1270 transmits the printing data to an image forming device supporting the selected printing option. However, if two or more image forming devices on the user interface support the selected printing option, the display unit 1230 provides a second user interface displaying all of the image forming devices supporting the selected printing option. In this case, the display unit 1230 provides the user interface illustrated in FIG. 11. If the user interface illustrated in FIG. 11 is provided, the selection unit 1250 selects an image forming device through which the printing data is to be output, from among the image forming devices on the user interface illustrated in FIG. 11, and the transmission unit 1270 transmits the printing data to the image forming device selected by the selection unit 1250. In more detail, if a "network printer 1" is selected from the user interface illustrated in FIG. 11, the transmission unit 1270 transmits the printing data to the "network printer 1" so as to output the printing data. Also, the display unit 1230 displays information on the image forming device through which the printing data is output. In this case, the information displayed on the display unit 1230 may include information on at least one of a model name and a connection means of the image forming device.

Also, if two or more image forming devices on the user interface support the selected printing option, the transmission unit 1270 may transmit the printing data to an image forming device having a higher priority based on a preset priority order.

The embodiments of aspects of the present invention can be written as computer programs and can be implemented in general-use digital computers that execute the programs using a computer readable recording medium. A structure of data used for the embodiments of the present invention can be recorded in a computer readable recording medium by various recording means. Examples of the computer readable recording medium include magnetic storage media (e.g., ROM, floppy disks, hard disks, etc.), and optical recording media (e.g., CD-ROMs, or DVDS). Moreover, aspects can be implemented through carrier waves (e.g., transmission through the Internet).

As described above, according to aspects of the present general inventive concept, printing data may be output through an image forming device supporting a desired printing option, without checking printing options of image forming devices whenever the printing data is to be output, by providing a user interface displaying printing options supported by image forming devices connected to a host device in which a universal printer driver is installed; selecting at least one printing option from the user interface; and outputting printing data through an image forming device supporting the selected printing option. Furthermore, information on an image forming device through which printing data is output may be checked.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming method using a universal printer driver, comprising:
   determining printing options supported by a plurality of image forming devices connected to a host device in which the universal printer driver is installed;
   providing, by a processor, a user interface displaying the determined printing options;
   selecting at least one printing option from the provided user interface;
   selecting at least one image forming device of the plurality of image forming devices determined to support the selected at least one printing option; and
   outputting printing data through the selected at least one image forming device supporting the selected printing option,
   wherein the supported printing options are determined and provided prior to selection of the at least one image forming device,
   the outputting of the printing data comprises outputting the printing data through a higher priority image forming device having a higher priority based on a preset priority order if two or more image forming devices on the user interface supporting the selected printing option,
   the preset priority order is based upon remaining printer toner of each of the two or more image forming devices,
   wherein the selecting of the at least one printing option from the provided user interface further comprises:
   checking whether any of the connected plurality of image forming devices does not support the selected at least one printing option after the at least one printing option is selected, and
   disabling a non-selected printing option for selection in an updated user interface displaying updated printing options if the disabled non-selected printing option is only supported by a second image forming device of the plurality of image forming devices that does not support the selected at least one printing option on the user interface after the at least one printing option is selected.

2. The image forming method of claim 1, wherein the outputting the printing data comprises providing a second user interface displaying the image forming devices supporting the selected printing option if two or more image forming devices on the user interface support the selected printing option and if the selection of printer options is completed.

3. The image forming method of claim 2, wherein the user interface and the second user interface are provided using a same window or different windows.

4. The image forming method of claim 1, further comprising displaying information on the image forming device through which the printing data is output after the printing data is output.

5. The image forming method of claim 1, wherein the providing the user interface comprises enabling the printing options supported by the image forming devices connected to the host device.

6. The image forming method of claim 5, wherein the providing the user interface further comprises:
   checking whether the connected image forming devices are able to print data; and
   disabling, on the user interface, a printing option supported only by an image forming device that is unable to print data.

7. The image forming method of claim 5, wherein the providing of the user interface further comprises:
   checking whether the connected image forming devices are able to print data, and
   not displaying, on the user interface, a printing option supported only by an image forming device that is unable to print data.

8. A non-transitory computer readable recording medium having recorded thereon a computer program for executing the image forming method of claim 1.

9. The image forming method of claim 1, wherein disabling the non-selected printing option includes one or more of: not displaying the non-selected printing option that does not support the selected at least one printing option on the user interface and displaying the non-selected printing option that does not support the selected at least one printing option on the user interface while making the non-selected printing option non-selectable for a user.

10. The image forming method of claim 1, wherein disabling the non-selected printing option includes displaying the non-selected printing option that does not support the selected at least one printing option on the user interface while making the non-selected printing option non-selectable for a user.

11. The image forming method of claim 1, wherein: selecting the at least one image forming device includes:
   selecting two or more image forming devices determined to support the selected at least one printing option,
   providing, for a user selection, at least another printing option from the provided updated user interface until selection of printer options is complete,
   selecting, by a user, the at least another printing option, and
   disabling a second non-selected printing option for selection in the updated user interface displaying the determined printing options if the disabled second non-selected printing option is only supported by a third image forming device of the plurality of image forming devices that does not support the selected at least another printing option and the selected at least one printing option.

12. A device using a universal printer driver, comprising:
   a display unit to determine printing options supported by a plurality of image forming devices connected to a host device in which the universal printer driver is installed, and to provide a user interface displaying the determined printing options;
   a selection unit to select at least one printing option from the provided user interface;
   a device checking unit to check whether any of the connected plurality of image forming devices does not support the selected at least one printing option whenever the selection unit selects printing options;

a user interface modification unit to disable a non-selectable printing option for selection in an updated user interface displaying updated printing options if the disabled non-selected printing option is only supported by a connected second image forming device of the plurality of image forming devices that does not support the selected at least one printing option, on the user interface, after the at least on printing option is selected; and a transmission unit outputting printing data through a selected one of the plurality of image forming devices, wherein the selected one of the plurality of image forming devices supports the selected at least one printing option, wherein the supported printing options are determined and provided prior to selection of the selected one of the plurality of image forming devices, the transmission unit transmits the printing data to a higher priority image forming device having a higher priority based on a preset priority order if two or more of the image forming devices on the user interface support the selected printing option, the display unit provides the user interface that is modified by the user interface modification unit, and the preset priority order is based upon remaining printer toner of each of the two or more image forming devices.

13. The device of claim 12, wherein the display unit provides a second user interface displaying the image forming devices supporting the selected printing option if two or more image forming devices on the user interface support the selected printing option and if the selection of printer options is completed.

14. The device of claim 13, wherein the user interface and the second user interface are provided by using a same window or different windows.

15. The device of claim 12, wherein the display unit displays information on the image forming device through which the printing data is output.

16. The device of claim 12, further comprising a user interface modification unit that enables the printing option supported by the image forming devices connected to the host device, and wherein the display unit provides the user interface modified by the user interface modification unit.

17. The device of claim 16, further comprising a determination unit checking whether the connected image forming devices are able to print data, wherein the user interface modification unit disables the printing option supported only by the image forming device that is unable to print data, on the user interface, and wherein the display unit provides the user interface modified by the user interface modification unit.

18. The device of claim 17, wherein the determination unit comprises a connection checking unit checking whether the image forming devices are currently connected by performing data communication with the image forming devices, and determines an image forming device that is not connected to the device to be the image forming device that is unable to print data.

19. An image forming method using a universal print driver, comprising:

determining, using a processor, printing options supported by a plurality of image forming devices connected to a host device;

disabling printing options not supported by the image forming devices connected to a host device;

selecting at least one of the determined printing options; and selecting one of the connected image forming devices supporting the selected at least one of the determined printing options and outputting printing data through the selected one of the connected image forming device supporting the selected at least one of the determined printing options, wherein the supported printing options are determined prior to selection of the one image forming device, the selecting one of the connected image forming devices comprises outputting the printing data through one of the connected image forming devices having a higher priority based on a preset priority order if two or more connected image forming devices support the selected at least one of the determined printing options, the preset priority order is based upon remaining printer toner of each of the two or more image forming devices, and the selecting of the one printing option comprises:

checking whether any of the connected image forming devices does not support the selected at least one of the determined printing options when a printing option is selected; and disabling a non-selected printing option for selection in an updated user interface displaying updated printing options if the disabled non-selected printing option is only supported by a second image forming device of the plurality of image forming devices that does not support the selected at least one of the determined printing options on the user interface after the at least one determined printing options is selected.

20. The method of claim 19, wherein the determining printing options comprises:

detecting the connected image forming devices; and determining, for each of the connected image forming devices, which of the printing options are not available.

21. The method of claim 19, wherein the disabling printing options comprises determining which of the printing options are not available.

* * * * *

UNITED STATES PATENT AND TRADEMARK OFFICE
CERTIFICATE OF CORRECTION

PATENT NO. : 8,873,071 B2
APPLICATION NO. : 12/369090
DATED : October 28, 2014
INVENTOR(S) : Myung-yul Jang Page 1 of 1

It is certified that error appears in the above-identified patent and that said Letters Patent is hereby corrected as shown below:

On the Title Page

Column 2, Item [57] (Abstract), Line 11, Delete "on" and insert -- one --, therefor.

Signed and Sealed this
Thirtieth Day of June, 2015

Michelle K. Lee
*Director of the United States Patent and Trademark Office*